United States Patent
Biswas et al.

(10) Patent No.: US 8,908,691 B2
(45) Date of Patent: Dec. 9, 2014

(54) VIRTUAL ETHERNET PORT AGGREGATION (VEPA)-ENABLED MULTI-TENANT OVERLAY NETWORK

(75) Inventors: Amitabha Biswas, San Francisco, CA (US); Uday S. Nagaraj, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 13/489,269

(22) Filed: Jun. 5, 2012

(65) Prior Publication Data

US 2013/0322446 A1    Dec. 5, 2013

(51) Int. Cl.
*H04L 12/28* (2006.01)
(52) U.S. Cl.
USPC .......................................................... 370/392
(58) Field of Classification Search
USPC ................................ 370/392, 360
See application file for complete search history.

(56) References Cited

U.S. PATENT DOCUMENTS

| 7,797,411 | B1 | 9/2010 | Guruswamy et al. |
| 7,903,655 | B2 | 3/2011 | Gooch et al. |
| 2010/0094982 | A1 | 4/2010 | Budhia et al. |
| 2012/0216273 | A1* | 8/2012 | Rolette et al. .................. 726/13 |
| 2013/0034094 | A1* | 2/2013 | Cardona et al. ............... 370/360 |

* cited by examiner

*Primary Examiner* — Albert T Chou
(74) *Attorney, Agent, or Firm* — Zilka-Kotab, PC (57) ABSTRACT

In accordance with one embodiment, a system that may be used for enabling Virtual Ethernet Port Aggregation (VEPA) in an overlay network includes a host server providing a virtual switch, the virtual switch including logic adapted for receiving a packet from a first virtual machine (VM) on the host server, logic adapted for determining that a destination of the packet is a second VM common to the host server, logic adapted for encapsulating the packet with a tunnel header to form an overlay packet, logic adapted for sending the overlay packet via a tunnel to a physical networking element to have inspection services performed thereon, logic adapted for receiving the overlay packet from the physical networking element, logic adapted for de-encapsulating the overlay packet to retrieve a serviced packet, and logic adapted for forwarding the serviced packet to the second VM, wherein the tunnel header includes tenant specific information.

20 Claims, 7 Drawing Sheets

VIRTUAL ETHERNET PORT AGGREGATION (VEPA)-ENABLED MULTI-TENANT OVERLAY NETWORK

BACKGROUND

The present invention relates to data center infrastructure, and more particularly, this invention relates to enabling Virtual Ethernet Port Aggregation (VEPA) in a multi-tenant overlay network.

VEPA is a mechanism that offloads checking and enabling inter virtual machine (VM) traffic (access control) from servers hosting the VMs to physical networking elements, such as switches, routers, etc., to which the servers are connected.

In an overlay network environment, traffic originating from VMs is encapsulated in a tunneled packet. Due to this constraint, physical networking elements in the overlay network may not be able to enforce client defined forwarding rules on a VM's traffic since the data needed for sanity checking is not available at standard offsets within the complete tunneled packet.

Note that in VEPA, a sender and receiver of traffic reside on the same server, but have different identification information, such as different media access control (MAC) addresses, internet protocol (IP) addresses, etc. Hence for a tunnel header, the source and destination information will represent the same server. The tunnel headers however, comprise tenant information which is used to perform access control operations. Additionally, the tunnel headers may be built as a User Datagram Protocol (UDP) over IP datagram.

Physical networking elements today do not have the ability to remove the tunnel headers while retaining tenant specific information, perform access control operations on the native virtual machine traffic, reattach the tunnel header (while modifying certain destination addressing information), and then send the packet back to the originating server. However, physical networking elements have very sophisticated access control mechanisms available to perform deep packet inspection operations at higher speeds than would be possible on servers. Accordingly, it would be beneficial to have a solution where VEPA is provided to tunneled packets in an overlay network environment.

SUMMARY

In one embodiment, a system includes a host server providing a virtual switch, the virtual switch including logic adapted for receiving a packet from a first virtual machine (VM) on a host server, logic adapted for determining that a destination of the packet is a second VM common to the host server, logic adapted for encapsulating the packet with a tunnel header to form an overlay packet, logic adapted for sending the overlay packet via a tunnel to a physical networking element to have inspection services performed thereon, logic adapted for receiving the overlay packet from the physical networking element, logic adapted for de-encapsulating the overlay packet to retrieve a serviced packet, and logic adapted for forwarding the serviced packet to the second VM, wherein the tunnel header includes tenant specific information.

In another embodiment, a method for enabling VEPA in an overlay network includes receiving a packet from a first VM on a host server, determining that a destination of the packet is a second VM common to the host server, encapsulating the packet with a tunnel header to form an overlay packet, sending the overlay packet via a tunnel to a physical networking element to have inspection services performed thereon, receiving the overlay packet from the physical networking element, de-encapsulating the overlay packet to retrieve a serviced packet, and forwarding the serviced packet to the second VM, wherein the tunnel header includes tenant specific information.

In yet another embodiment, a computer program product for enabling VEPA in an overlay network includes a computer readable storage medium having computer readable program code embodied therewith, the computer readable program code including computer readable program code configured for receiving a packet from a first VM on a host server, computer readable program code configured for determining that a destination of the packet is a second VM common to the host server, computer readable program code configured for encapsulating the packet with a tunnel header to form an overlay packet, computer readable program code configured for sending the overlay packet via a tunnel to a physical networking element to have inspection services performed thereon, computer readable program code configured for receiving the overlay packet from the physical networking element, computer readable program code configured for de-encapsulating the overlay packet to retrieve a serviced packet, and computer readable program code configured for forwarding the serviced packet to the second VM, wherein the tunnel header includes tenant specific information.

According to another embodiment, a system includes logic adapted for receiving an overlay packet from a virtual switch via a tunnel, logic adapted for de-encapsulating the overlay packet by removing a tunnel header to retrieve an inner packet, logic adapted for determining a source and destination of the inner packet, logic adapted for performing inspection services on the inner packet based on tenant specific information included in the overlay packet, logic adapted for determining whether to send the inner packet to the destination, logic adapted for, when the determination is to send the inner packet to the destination, re-encapsulating the inner packet into the tunnel header to form the overlay packet and sending the overlay packet to the virtual switch via the tunnel, and logic adapted for, when the determination is to not send the packet to the destination, dropping the packet, wherein the tunnel header includes tenant specific information.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, Virtual Ethernet Port Aggregation (VEPA) is enabled in an overlay network in order to take advantage of the networking elements' ability to provide access control operations on overlay network traffic in conjunction with certain information from the tunnel headers. The native capabilities of processors, such as application specific integrated circuits (ASICs) in the physical networking elements may then be leveraged to provide higher throughput and more sophisticated packet inspection than is possible using the servers only.

In one general embodiment, a system includes a host server providing a virtual switch, the virtual switch including logic adapted for receiving a packet from a first virtual machine (VM) on a host server, logic adapted for determining that a destination of the packet is a second VM common to the host server, logic adapted for encapsulating the packet with a tunnel header to form an overlay packet, logic adapted for sending the overlay packet via a tunnel to a physical networking element to have inspection services performed thereon, logic adapted for receiving the overlay packet from the physical networking element, logic adapted for de-encapsulating the overlay packet to retrieve a serviced packet, and logic adapted for forwarding the serviced packet to the second VM, wherein the tunnel header includes tenant specific information.

In another general embodiment, a method for enabling VEPA in an overlay network includes receiving a packet from a first VM on a host server, determining that a destination of the packet is a second VM common to the host server, encapsulating the packet with a tunnel header to form an overlay packet, sending the overlay packet via a tunnel to a physical networking element to have inspection services performed thereon, receiving the overlay packet from the physical networking element, de-encapsulating the overlay packet to retrieve a serviced packet, and forwarding the serviced packet to the second VM, wherein the tunnel header includes tenant specific information.

In yet another general embodiment, a computer program product for enabling VEPA in an overlay network includes a computer readable storage medium having computer readable program code embodied therewith, the computer readable program code including computer readable program code configured for receiving a packet from a first VM on a host server, computer readable program code configured for determining that a destination of the packet is a second VM common to the host server, computer readable program code configured for encapsulating the packet with a tunnel header to form an overlay packet, computer readable program code configured for sending the overlay packet via a tunnel to a physical networking element to have inspection services performed thereon, computer readable program code configured for receiving the overlay packet from the physical networking element, computer readable program code configured for de-encapsulating the overlay packet to retrieve a serviced packet, and computer readable program code configured for forwarding the serviced packet to the second VM, wherein the tunnel header includes tenant specific information.

According to another general embodiment, a system includes logic adapted for receiving an overlay packet from a virtual switch via a tunnel, logic adapted for de-encapsulating the overlay packet by removing a tunnel header to retrieve an inner packet, logic adapted for determining a source and destination of the inner packet, logic adapted for performing inspection services on the inner packet based on tenant specific information included in the overlay packet, logic adapted for determining whether to send the inner packet to the destination, logic adapted for, when the determination is to send the inner packet to the destination, re-encapsulating the inner packet into the tunnel header to form the overlay packet and sending the overlay packet to the virtual switch via the tunnel, and logic adapted for, when the determination is to not send the packet to the destination, dropping the packet, wherein the tunnel header includes tenant specific information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
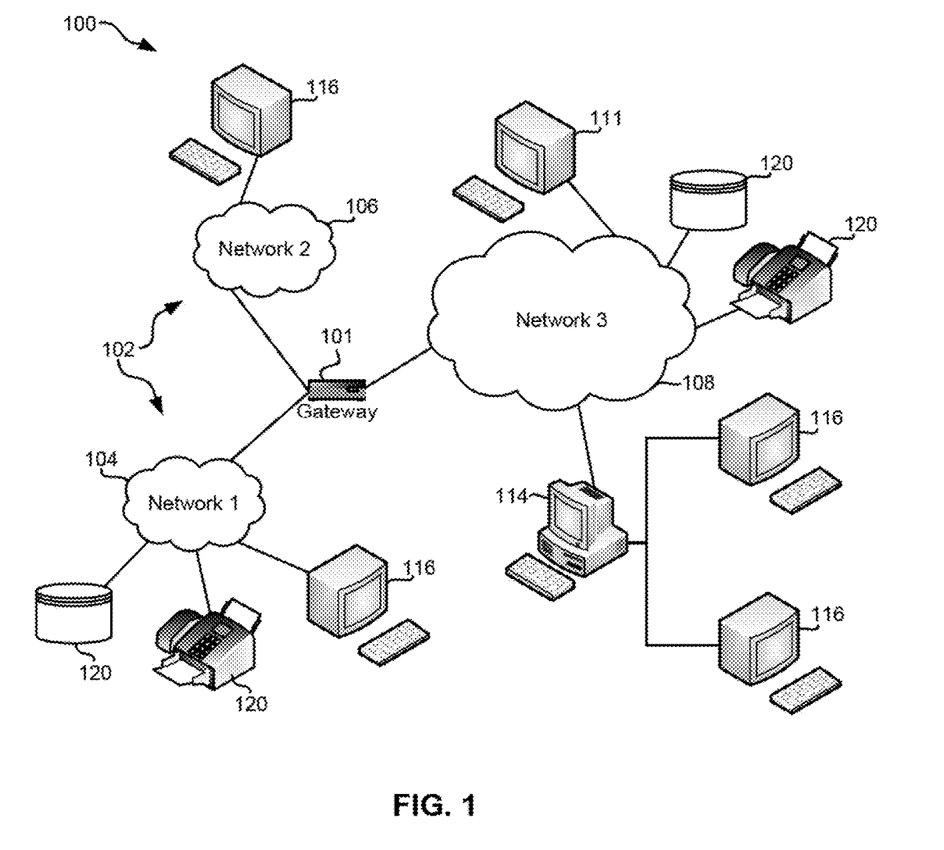
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
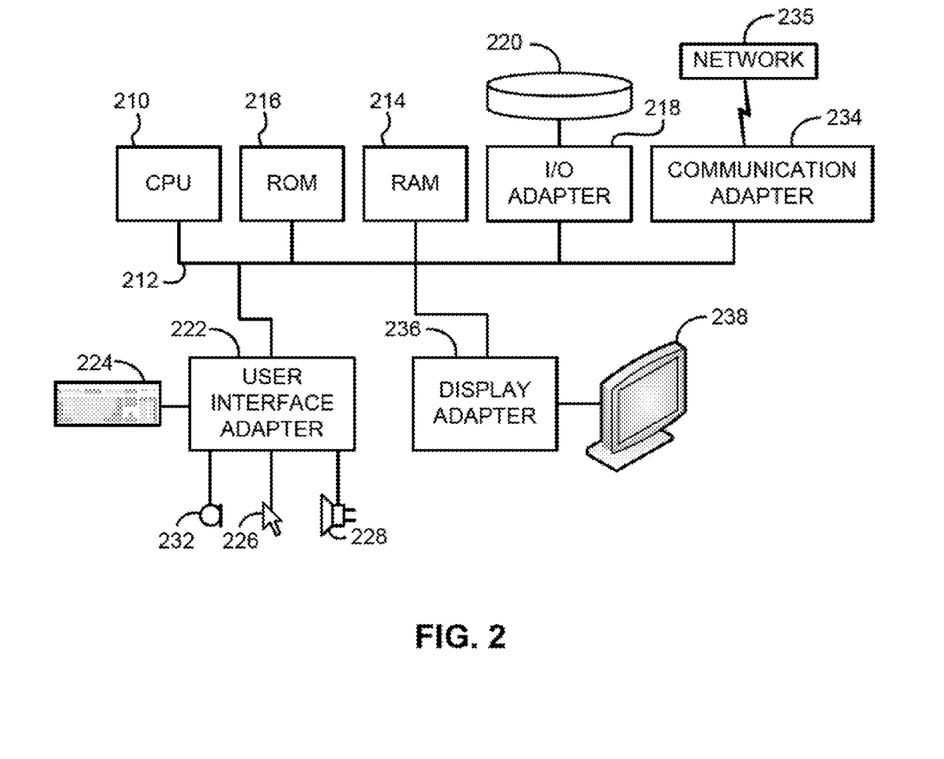
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
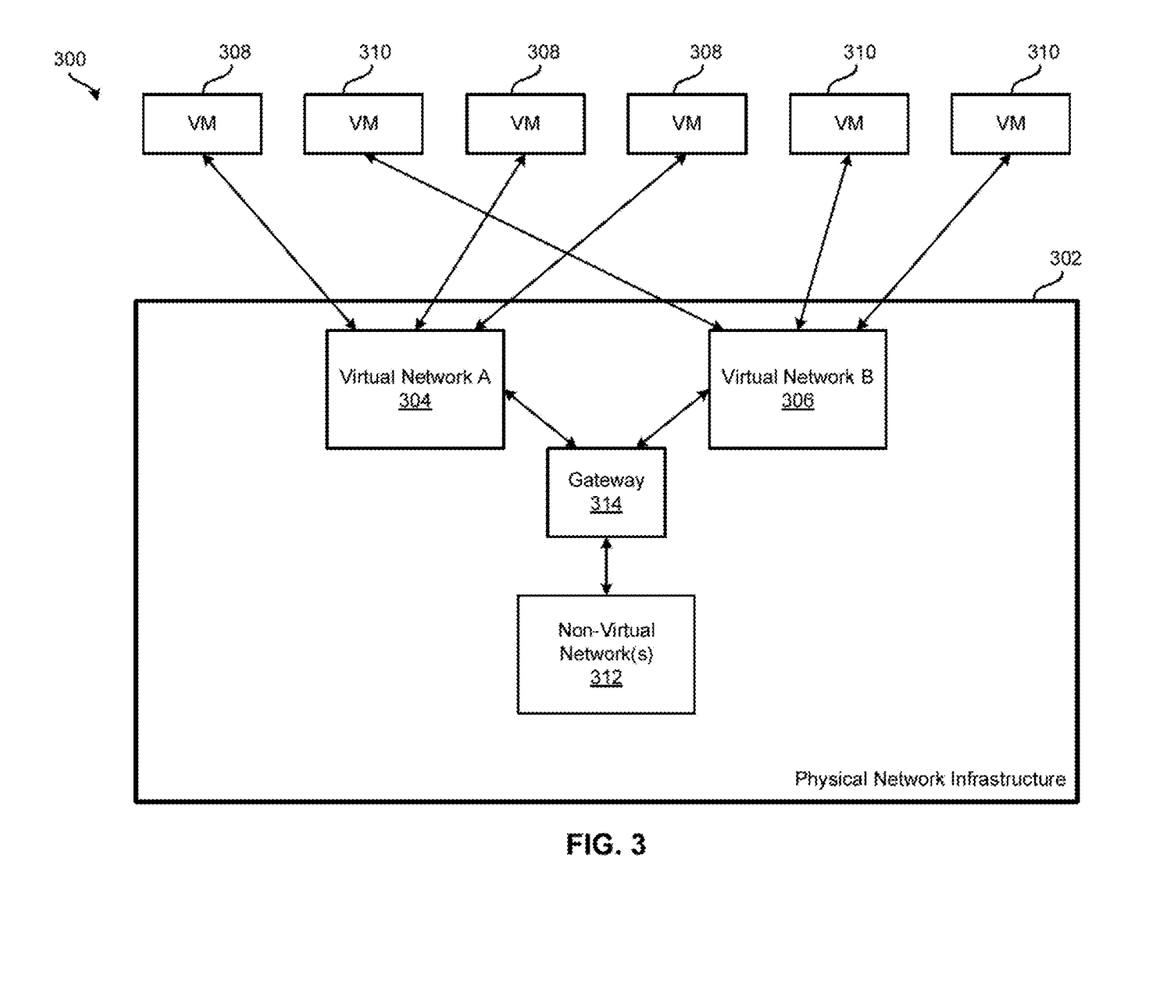
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across layer 3-domains, between one subnet to another subnet, internet protocol (IP) subnet to IP subnet, etc. But if it the architecture is similar to a large flat switch, in a very large layer 2-domain, then the VMs are aided in their attempt to move data across the architecture.

Figure 4:
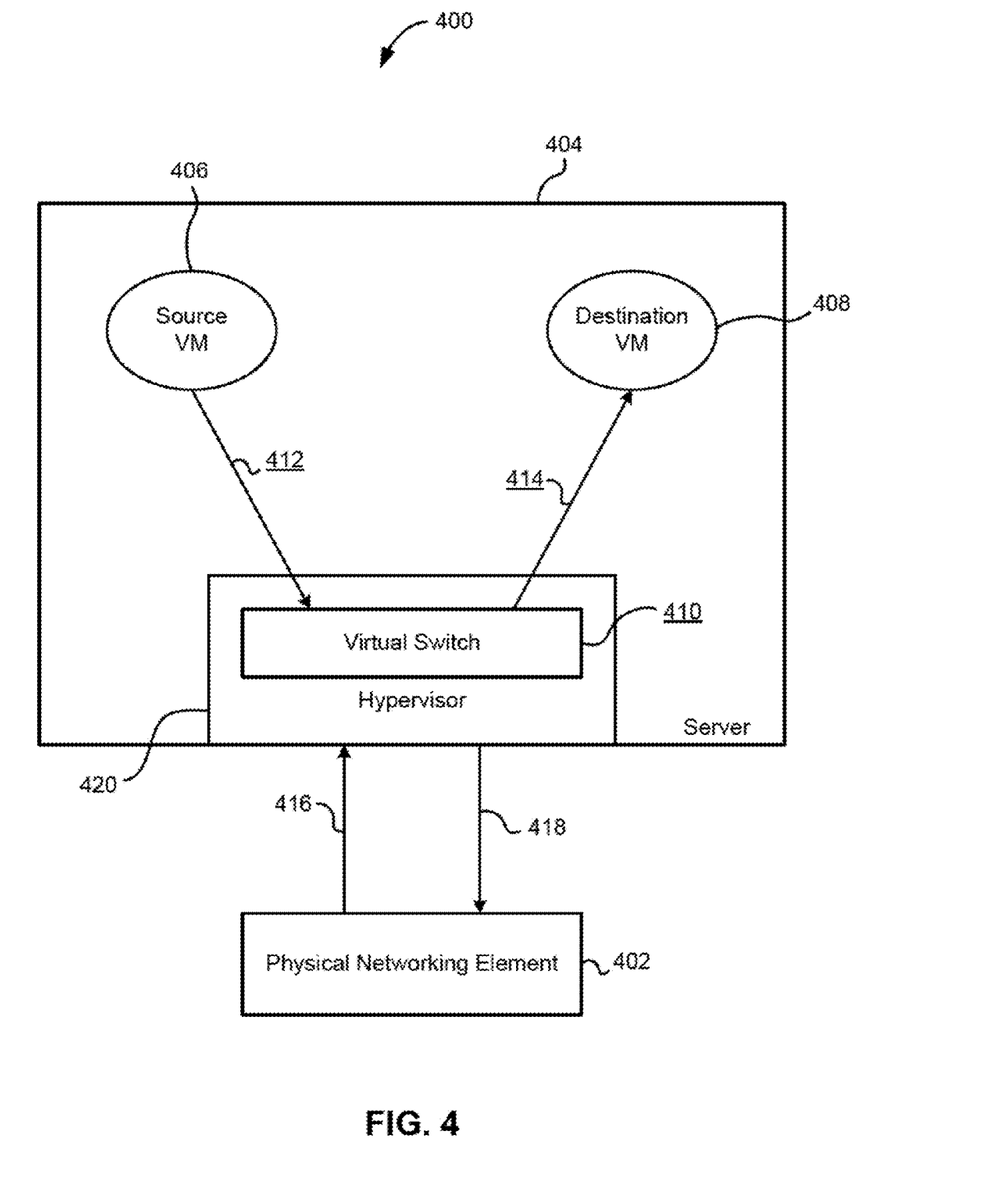
FIG. 4 shows a portion of an overlay network environment, according to one embodiment.

Now referring to FIG. 4, a portion of an overlay network environment 400 is shown, according to one embodiment, in order to explain how VEPA may be enabled in the overlay networking environment 400. In this overlay network environment 400, a physical switch 402, a virtual switch 410 on a host server 404, and two VMs (a source VM 406 and a destination VM 408) are shown. The virtual switch 410 resides within a hypervisor 420 resident on the host server 404. Of course, the overlay network environment 400 may include more components, relationships, functionality, and/or complexity than that shown in FIG. 4, as would be understood by one of skill in the art.

As shown, traffic 412 (which comprises an original packet) from any source VM 406 ingresses at a virtual switch 410 resident on a host server 404. Even though only one packet is described herein, any of the traffic described herein may comprise multiple packets, of any type known in the art, such as IP packets, overlay packets, etc.

This traffic 412 is destined for the destination VM 408, but when VEPA is enabled in the overlay networking environment 400, instead of being directed to the destination VM 408 by the virtual switch 410, it is instead routed through the physical networking element 402. This is to allow the physical networking element 402 to perform certain sanity checks, inspection services, etc., on the traffic 412 instead of relying on the virtual switch 410 to perform these functions. Typically, the physical networking element 402 is better equipped to handle this functionality faster and more efficiently than the virtual switch 410.

Figure 5A:
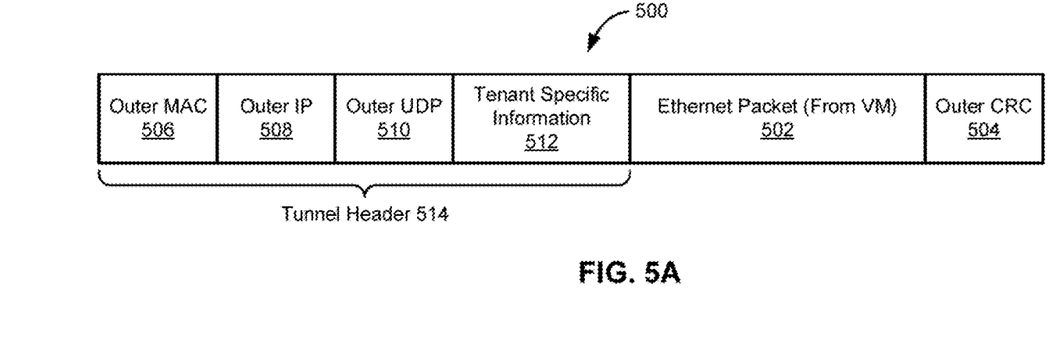
FIG. 5A shows packet encapsulation, according to one embodiment.
Figure 5B:
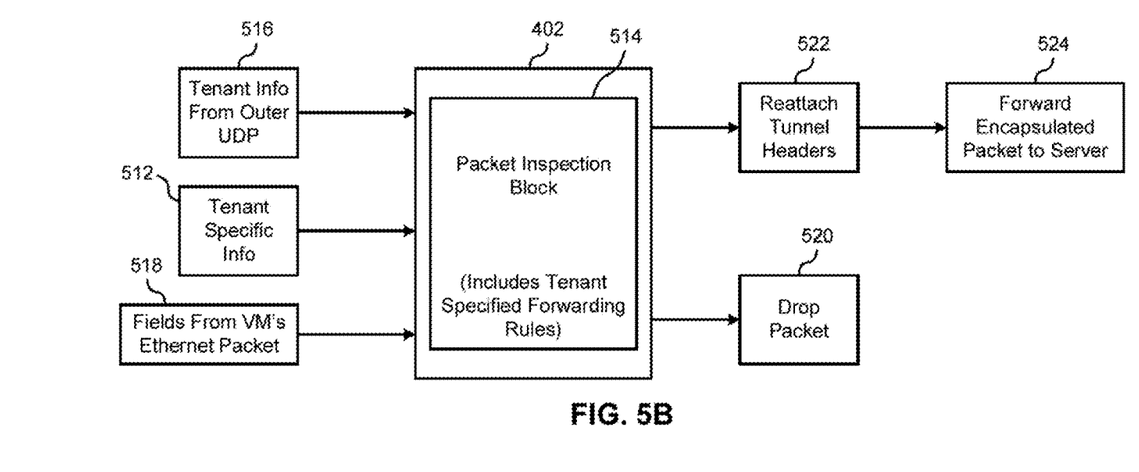
FIG. 5B shows information exchange for packet encapsulation, according to one embodiment.

The virtual switch 410 encapsulates the original packet received from the source VM 406 into a tunnel and adds tenant specific information into certain fields in the tunnel header, as described in more detail in regard to FIGS. 5A-5B. Referring again to FIG. 4, this tunneled packet is then forwarded out of a physical network interface of the host server 404 to the physical networking element 402, such as a switch, router, gateway device, etc. Since VEPA is enabled in the overlay network environment 400, the source and destination of the tunneled packet are the same, as the address is the host server 404; however, the traffic 412 received from the source VM 406, according to embodiments described herein, may be sanitized and/or have other services performed thereon by the physical networking element 402 to which the host server 404 is connected.

Accordingly, when the traffic 418 (comprising an overlay packet encapsulating the original packet) from the host server 404 ingresses the physical networking element 402, ingress logic of the physical networking element 402 strips the tunnel headers from the overlay packet while retaining tunnel specific and server location information, as described in more detail in FIGS. 5A-5B.

Referring again to FIG. 4, the original packet sent by the source VM 406 along with the information specifying the VM's tenancy is forwarded to packet inspection logic of the physical networking element 402. This component of the physical networking element 402 is adapted for using the tenant specific information along with various fields in the original packet to perform packet inspection and/or sanity tests, among other possible services, in various embodiments.

Once the original packet has been verified as being safe to send to the destination VM 408, as intended by the source VM 406, the original packet is then re-encapsulated into a tunnel, and the tunnel headers are repopulated with the tenant information and destination information in the physical networking element 402. This traffic 416 (including the tunneled packet) is then forwarded back to the host server 404 to be received by the virtual switch 410. When the tunneled packet is received at the virtual switch 410, assuming that the tunnel headers have enough tenant and destination identifying information, the virtual switch 410 removes the tunnel headers and forwards the un-encapsulated packet to the destination VM 408 as traffic 414. Accordingly, traffic 414 destined for the destination VM 408 egresses from the virtual switch 410 after being received therein and having tunnel headers and associated information de-encapsulated from the original packet.

In this way, multi-tenancy may be supported in the overlay network environment 400, while still having VEPA enabled in the environment. This allows for ASICs or other hardware elements in the physical networking element 402 to perform services, application of access control lists (ACLs) or any other desired functionality to a packet sent from one VM to another VM within the overlay network.

Now referring to FIG. 5A, packet encapsulation 500 is shown according to one embodiment. The packet encapsulation 500 includes outer and inner portions, where the inner packet is the original packet (Ethernet packet 502 produced by/received from the source VM), and the outer headers relate to the overlay encapsulation. As shown, the tunnel (overlay) header 514 comprises an outer media access control (MAC) header 506, an outer IP header 508, and outer user datagram protocol (UDP) header 510, and tenant specific information 512. The outer cyclic redundancy check (CRC) 504 may be added as known in the art.

In this encapsulation 500, tenant specific information 512 may be added to the tunnel (overlay) header 514, and some tenant specific information may also be included in the outer UDP header 510, as allowed by the particular overlay network environment being used. In one embodiment, Virtual eXtensible Local Area Network (VXLAN) or a modified version of VXLAN may be used. Of course, any other overlay network technology, protocol, and/or devices may be used as known in the art.

As shown in FIGS. 5A-5B, a packet inspection block 514 or module of the physical networking element 402 may receive information from a received overlay packet, such as tenant specific information 516 from the outer UDP header 510, tenant specific information 512, and certain fields 518 from the source VM's Ethernet packet 502, etc. This information may be used by the packet inspection block 514 to determine how to respond to the receipt of the overlay packet.

In one approach, if the inspection block 514 determines that the packet is acceptable to be forwarded to its intended destination (the destination VM), then the tunnel headers are reattached 522, and the encapsulated packet is forwarded 524 to the host server for receipt by the virtual switch (and subsequent forwarding to the destination VM).

According to another approach, if the inspection block 514 determines that the packet is not acceptable to be forwarded to its intended destination (the destination VM), then the packet is dropped 520.

In one approach, the inner packet may be analyzed to determine one or more services to perform on the inner packet. For example, in one embodiment where certain services are performed only on a subset of network traffic (such as for a specific tenant only, for a specific destination only, for a specific source only, etc.), a packet requiring those services must be identified as requiring those services in order to receive the service of interest. Accordingly, at least part of the determination of whether the packet should be forwarded to the destination involves a determination of whether and which services are to be performed, in one embodiment.

According to various embodiments, services that may be performed on a packet include, but are not limited to firewall services, intrusion prevention system (IPS) services, intrusion detection system (IDS), IPS/IDS services, server load balancing services, LAN optimization services, VPN services, video optimization services, network address translation (NAT) services, encryption services, decryption services, application of access control lists (ACLs), etc., among many other possibilities, as would be known to one of skill in the art.

In one embodiment, a tunnel header (such as a VXLAN frame format) may be as follows:

This frame format may be used for determining if a packet should be inspected for an inner packet in a number of different ways. In one such way, the destination port (Dest Port) may be determined. In the frame format shown above, as an example, the destination port is a VXLAN Port, which indicates that the packet has a tunnel header. Accordingly, this packet may be un-encapsulated in order to determine what the inner packet comprises, and then whether services should be performed on the inner packet. Of course, other ways of determining whether services should be performed on an inner packet, and if a packet comprises an inner packet may be used, as known to those of skill in the art and described herein.

Figure 6:
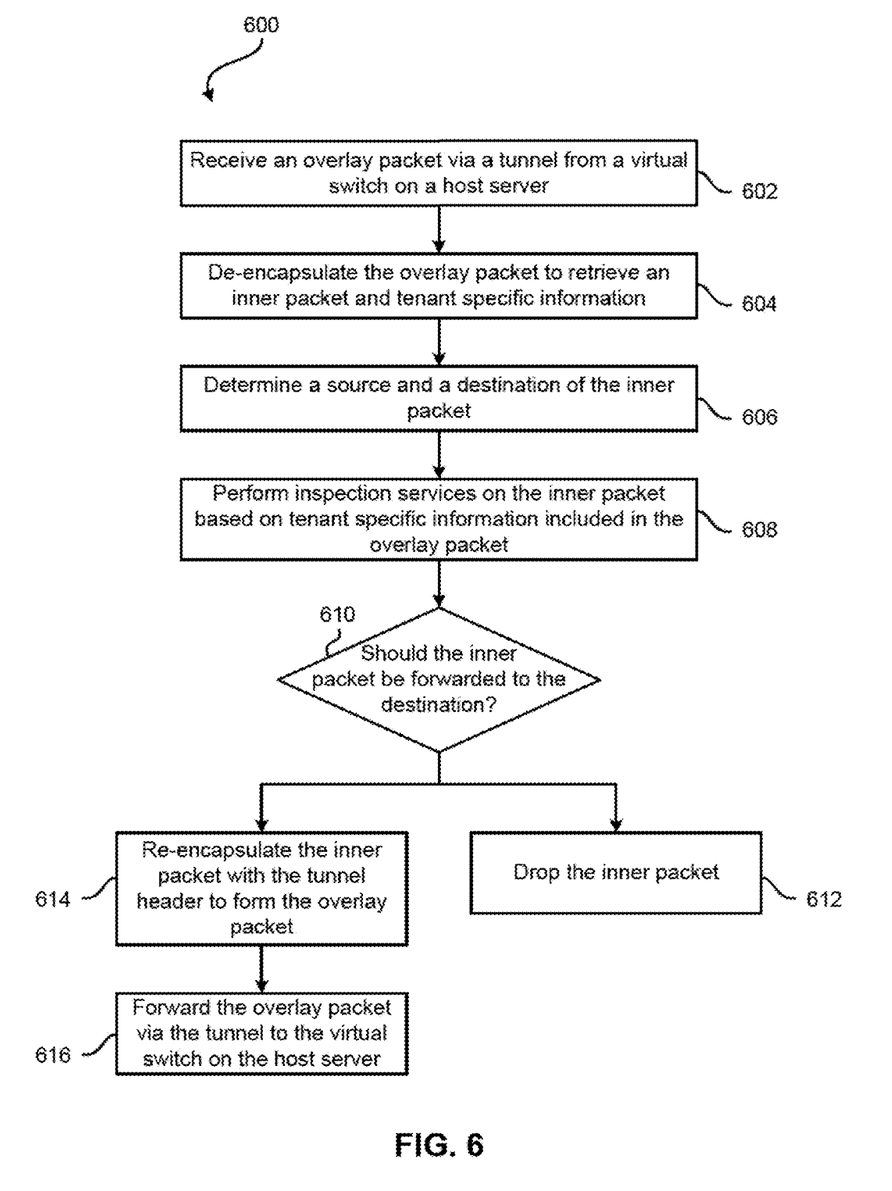
FIG. 6 is a flowchart of a method, according to one embodiment.

Now referring to FIG. 6, a flowchart of a method 600 is shown, according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a physical networking element (such as a switch, a router, a gateway, etc.), a processor (such as a CPU, an ASIC, an FPGA, etc.), in various approaches.

As shown in FIG. 6, method 600 may initiate with operation 602, where an overlay packet is received via a tunnel from a virtual switch on a host server.

In operation 604, the overlay packet is de-encapsulated to retrieve an inner packet and tenant specific information. Of course, the packet must first be an overlay packet for de-encapsulation to take place, and so it may be determined that it is an overlay packet. This may be accomplished by determining a destination port of the outer UDP header. If the destination port is a virtual LAN port, such as a VXLAN port, then it may be assumed that the packet includes a tunnel header.

The inner packet may be of any type known in the art, such as I/O packets (e.g., Fiber Channel over Ethernet (FCoE) packets), control packets, IP packets, voice packets, etc.

In operation 606, a source and a destination of the inner packet is determined. This information may be used in order to determine whether it is appropriate to forward the packet to its intended destination or not, along with what, if any services, to perform on the inner packet.

In operation 608, inspection services are performed on the inner packet, as determined by the tenant specific information included in the headers of the overlay packet, the destination, the source, and any other useful information included in the inner packet or the tunnel headers.

In operation 610, it is determined whether the inner packet should be forwarded to its intended destination. For example, if the packet is sent from Tenant A, and is destined for Tenant B, and there is no sharing among these tenants, then the packet should not be forwarded. In another example, if the destination shares a tenant with the source, then the packet may be sent to this destination. Of course, many other possible scenarios may exist, and the embodiments described herein are not meant to be limited to only tenant specific forwarding decisions.

If, in operation 610 it is determined to forward the inner packet to the destination, then in operation 614, the inner packet is re-encapsulated into an overlay packet, which may be the same overlay packet in which the inner packet was received. Then, in operation 616, the overlay packet is forwarded to the virtual switch on the host server, presumably to be forwarded on to its intended destination.

According to some further embodiments, the tenant specific information may include a virtual network identifier (VNID), at least some of the tenant specific information may be included in a UDP header, at least some of the tenant specific information may be included in a frame of the tunnel header designed to store tenant specific information, and/or the overlay network may adhere to VXLAN.

The method 600 may be performed, in various embodiments comprising all or some of the operations described in FIG. 6 in computer program products, other methods, logic, and/or systems.

In one such embodiment, a system may include logic adapted for receiving an overlay packet from a virtual switch via a tunnel, logic adapted for de-encapsulating the overlay packet by removing a tunnel header to retrieve an inner packet, logic adapted for determining a source and destination of the inner packet, logic adapted for performing inspection services on the inner packet based on tenant specific information included in the overlay packet, logic adapted for determining whether to send the inner packet to the destination, logic adapted for, when the determination is to send the inner packet to the destination, re-encapsulating the inner packet into the tunnel header to form the overlay packet and sending the overlay packet to the virtual switch via the tunnel, and logic adapted for, when the determination is to not send the packet to the destination, dropping the packet. The tunnel header may include tenant specific information.

Figure 7:
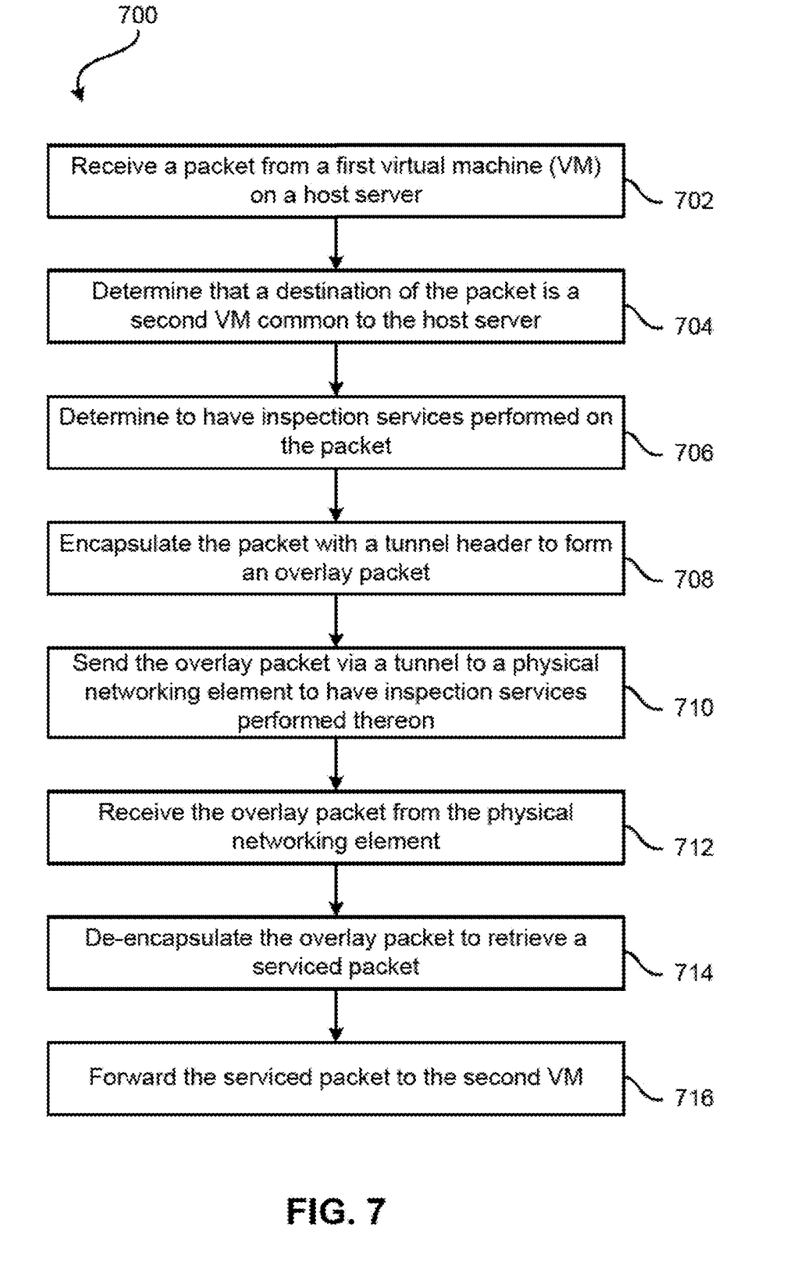
FIG. 7 is a flowchart of a method, according to one embodiment.

Now referring to FIG. 7, a flowchart of a method 700 is shown, according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a virtual switch on a host server, a processor (such as a CPU, an ASIC, an FPGA, etc.), in various approaches.

As shown in FIG. 7, method 700 may initiate with operation 702, where a packet is received from a first VM on a host server. In one approach, the packet is received by a virtual switch on the host server.

The packet may be of any type known in the art, such as I/O packets (e.g., Fiber Channel over Ethernet (FCoE) packets), control packets, IP packets, voice packets, etc.

In operation 704, it is determined that a destination of the packet is on a second VM common to the host server, e.g., it may be forwarded to the second VM without being sent to any physical networking elements.

In optional operation 706, it is determined that inspection services are to be performed on the packet, such as because of a destination address, a type of packet, a size of the packet, or any other criteria known in the art. In this case, it may be determined that VEPA should be used to have these services performed by a physical networking element.

In operation 708, the packet is encapsulated with a tunnel header to form an overlay packet, as described in more detail in FIGS. 5A-5B, in one approach.

In operation 710, the overlay packet is sent, via a tunnel, to the physical networking element to have inspection services performed thereon. Which services are to be performed may be stipulated, or the physical networking element may make this decision.

Presumably the physical networking element performs inspection services on the packet, as determined by the tenant specific information included in the headers of the overlay packet, the destination, the source, and any other useful information included in the packet or the tunnel header.

In operation 712, the overlay packet is received back from the physical networking element, and is de-encapsulated to retrieve a serviced packet in operation 714. Then, in operation 716, the serviced packet is forwarded to the second VM.

The method 700 may be performed, in various embodiments comprising all or some of the operations described in FIG. 7 in computer program products, other methods, logic, and/or systems.

In one such embodiment, a computer program product for enabling VEPA in an overlay network comprises a computer readable storage medium having computer readable program code embodied therewith. The computer readable program code comprises computer readable program code configured for receiving a packet from a first VM on a host server, computer readable program code configured for determining that a destination of the packet is a second VM common to the host server, computer readable program code configured for encapsulating the packet with a tunnel header to form an overlay packet, computer readable program code configured for sending the overlay packet via a tunnel to a physical networking element to have inspection services performed thereon, computer readable program code configured for receiving the overlay packet from the physical networking element, computer readable program code configured for de-encapsulating the overlay packet to retrieve a serviced packet, and computer readable program code configured for forwarding the serviced packet to the second VM, wherein the tunnel header comprises tenant specific information.

In some further embodiments, the tenant specific information may include a VNID or some other suitable tenant identifying information, at least some of the tenant specific information is included in a UDP header, at least some of the tenant specific information is included in a frame of the tunnel header designed to store tenant specific information, and/or the overlay network adheres to VXLAN.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a host server providing a virtual switch, the virtual switch comprising:
logic configured to receive a packet from a first virtual machine (VM) on the host server;
logic configured to determine that a destination of the packet is a second VM common to the host server;
logic configured to encapsulate the packet with a Layer-3 tunnel header to form an overlay packet, the overlay packet being configured as a Layer-3 packet;
logic configured to send the overlay packet via a Layer-3 tunnel to a physical networking element to have inspection services performed thereon;
logic configured to receive the overlay packet via the Layer-3 tunnel from the physical networking element after services have been performed thereon;

logic configured to de-encapsulate the overlay packet to retrieve a serviced packet; and logic configured to forward the serviced packet to the second VM, wherein the tunnel header comprises tenant specific information, the tenant specific information including a virtual network identifier (VNID), and wherein the host server is configured to natively transport Layer-3 packets across the Layer-3 tunnel.

2. The system as recited in claim 1, further comprising the physical networking element, the physical networking element comprising:

logic configured to receive the overlay packet at the physical networking element via the Layer-3 tunnel;

logic configured to de-capsulate the overlay packet to retrieve the packet;

logic configured to determine a source and destination of the packet;

logic configured to perform inspection services on the packet based on the tenant specific information included in the overlay packet;

logic configured to determine whether to send the packet to the destination;

logic configured to, when the determination is to send the packet to the destination, re-capsulate the packet into the Layer-3 tunnel header to form the overlay packet and send the overlay packet to the virtual switch on the host server via the Layer-3 tunnel; and logic configured to, when the determination is to not send the packet to the destination, drop the packet, wherein the physical networking element is configured to be located more than one hop from the host server.

3. The system as recited in claim 2, wherein the Layer-3 tunnel is an overlay network tunnel configured to natively transport Layer-3 packets thereacross.

4. The system as recited in claim 2, wherein the physical networking element is configured to be located in a different virtual local area network (VLAN) than the first VM on the host server.

5. The system as recited in claim 1, wherein at least some of the tenant specific information is included in a user datagram protocol (UDP) header, and wherein the overlay network adheres to Virtual eXtensible Local Area Network (VXLAN).

6. The system as recited in claim 1, wherein at least some of the tenant specific information is included in a frame of the Layer-3 tunnel header configured to store tenant specific information accessible to the physical networking element without de-capsulating the overlay packet.

7. A method for enabling Virtual Ethernet Port Aggregation (VEPA) in an overlay network, the method comprising:

receiving a packet from a first virtual machine (VM) on a host server;

determining that a destination of the packet is a second VM common to the host server;

encapsulating the packet with a Layer-3 tunnel header to form an overlay packet, the overlay packet being configured as a Layer-3 packet;

sending the overlay packet via a Layer-3 tunnel to a physical networking element to have inspection services performed thereon;

receiving the overlay packet via the Layer-3 tunnel from the physical networking element after services have been performed thereon;

de-encapsulating the overlay packet to retrieve a serviced packet; and forwarding the serviced packet to the second VM, wherein the tunnel header comprises tenant specific information, the tenant specific information including a virtual network identifier (VNID), and wherein the overlay packet is natively transported as a Layer-3 packet across the Layer-3 tunnel.

8. The method as recited in claim 7, further comprising:

receiving the overlay packet at the physical networking element via the Layer-3 tunnel;

de-encapsulating the overlay packet to retrieve the packet;

determining a source and destination of the packet;

performing inspection services on the packet based on the tenant specific information included in the overlay packet;

determining whether to send the packet to the destination by applying one or more access control lists (ACLs) to information corresponding to the packet;

when the determination is to send the packet to the destination, re-encapsulating the packet into the Layer-3 tunnel header to form the overlay packet and sending the overlay packet to the virtual switch on the host server via the Layer-3 tunnel; and when the determination is to not send the packet to the destination, dropping the packet.

9. The method as recited in claim 7, wherein the Layer-3 tunnel is an overlay network tunnel configured to natively transport Layer-3 packets thereacross.

10. The method as recited in claim 7, wherein at least some of the tenant specific information is included in a user datagram protocol (UDP) header.

11. The method as recited in claim 7, wherein at least some of the tenant specific information is included in a frame of the Layer-3 tunnel header designed to store tenant specific information.

12. The method as recited in claim 7, wherein the overlay network adheres to Virtual eXtensible Local Area Network (VXLAN).

13. A computer program product for enabling Virtual Ethernet Port Aggregation (VEPA) in an overlay network, the computer program product comprising a computer readable storage medium having computer readable program code embodied therewith, the computer readable program code comprising:

computer readable program code configured to receive a packet from a first virtual machine (VM) on a host server;

computer readable program code configured to determine that a destination of the packet is a second VM common to the host server;

computer readable program code configured to encapsulate the packet with a Layer-3 tunnel header to form an overlay packet, the overlay packet being configured as a Layer-3 packet;

computer readable program code configured to send the overlay packet via a Layer-3 tunnel to a physical networking element to have inspection services performed thereon;

computer readable program code configured to receive the overlay packet via the Layer-3 tunnel from the physical networking element after services have been performed thereon;

computer readable program code configured to de-encapsulate the overlay packet to retrieve a serviced packet; and computer readable program code configured to forward the serviced packet to the second VM, wherein the tunnel header comprises tenant specific information, the tenant specific information including a virtual network identifier (VNID), and wherein the host server is configured to natively transport Layer-3 packets across the Layer-3 tunnel.

14. The computer program product as recited in claim 13, wherein the Layer-3 tunnel is an overlay network tunnel configured to natively transport Layer-3 packets thereacross.

15. The computer program product as recited in claim 13, wherein at least some of the tenant specific information is included in a user datagram protocol (UDP) header, and wherein the overlay network adheres to Virtual eXtensible Local Area Network (VXLAN).

16. The computer program product as recited in claim 13, wherein at least some of the tenant specific information is included in a frame of the Layer-3 tunnel header configured to store tenant specific information accessible to the physical networking element without de-capsulating the overlay packet.

17. The computer program product as recited in claim 13, wherein the physical networking element is configured to be located in a different virtual local area network (VLAN) than the first VM on the host server.

18. A system, comprising:

logic configured to receive an overlay packet from a virtual switch via a Layer-3 overlay tunnel;

logic configured to de-encapsulate the overlay packet by removing a Layer-3 overlay tunnel header to retrieve an inner packet;

logic configured to determine a source and destination of the inner packet;

logic configured to perform inspection services on the inner packet based on tenant specific information included in the overlay packet;

logic configured to determine whether to send the inner packet to the destination;

logic configured to, when the determination is to send the inner packet to the destination, re-encapsulate the inner packet into the Layer-3 overlay tunnel header to form the overlay packet and send the overlay packet to the virtual switch via the Layer-3 overlay tunnel; and logic configured to, when the determination is to not send the packet to the destination, drop the packet, wherein the overlay tunnel header comprises tenant specific information, the tenant specific information including a virtual network identifier (VNID), and wherein the system is configured to natively transport Layer-3 overlay packets across the Layer-3 overlay tunnel.

19. The system as recited in claim 18, wherein the Layer-3 overlay tunnel is configured to natively transport Layer-3 packets thereacross.

20. The system as recited in claim 18, wherein at least some of the tenant specific information is included in a user datagram protocol (UDP) header, and wherein the overlay network adheres to Virtual eXtensible Local Area Network (VXLAN).

* * * * *